Jan. 14, 1936.　　　　J. E. METHVEN　　　　2,027,993

DEVICE FOR CUTTING ICE CUBES

Filed Feb. 7, 1935

WITNESSES
Edw. Thorpe
G. L. Kitchin

INVENTOR
John E. Methven
BY
Munn, Anderson & Liddy
ATTORNEYS

Patented Jan. 14, 1936

2,027,993

UNITED STATES PATENT OFFICE 2,027,993

DEVICE FOR CUTTING ICE CUBES

John E. Methven, Middletown, Ohio

Application February 7, 1935, Serial No. 5,468

3 Claims. (Cl. 219—21)

This invention relates to a device or apparatus for cutting ice cubes from a large block of ice, an object being to provide an improved construction which may be easily manipulated and which will function to quickly cut a number of cubes at one time.

Another object of the invention is to provide an electrically heated device having rectangular openings, with the parts between the openings comparatively small so that when heated the device may be placed on a block of ice and allowed to melt its way downwardly into the block for a desired distance, and then may be pulled gently in a direction at right angles to sever the cubes of ice from the main cake.

A further object more in detail is to provide a device for cutting small cubes of ice from a large block of ice, the structure including an arrangement of casing and insulated wires arranged in the casing, so positioned that there will be two wires in each part of the casing.

In the accompanying drawing—

Figure 3:
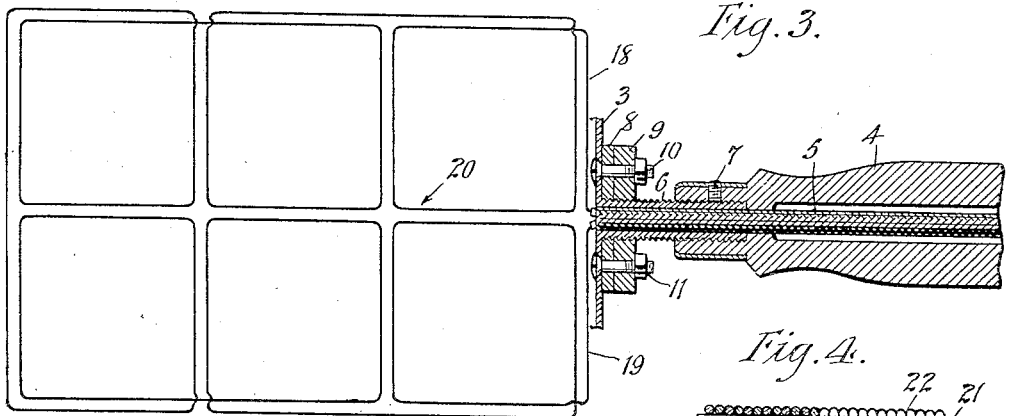
Fig. 3 is a view partly in section and partly in diagram illustrating the arrangement of the wires.

Referring to the accompanying drawing by numerals, 1 indicates a cake of ice, and 2 the device as a whole. The device is provided with what may be termed a frame 3 and a handle 4 secured to the frame as illustrated in Fig. 3. As shown in Fig. 3, the handle 4 is hollow so that an electric cable 5, carrying two insulated wires, may extend into the casing 3 and be protected as it enters the casing. As illustrated in Fig. 3, there is a threaded metallic tubular extension 6, either integral with or welded or otherwise rigidly secured to the casing 3. The handle 4 is screwed on to the threaded tubular extension 6 and is locked thereon by a suitable set screw 7. Bracing nuts 8 and 9 are also screwed on to the tubular member 6, said nuts being rigidly secured to the casing 3 by suitable bolts 10 and 11. In this way the casing, which is comparatively thin, is rigidly and strongly secured to the handle 4.

Figure 2:
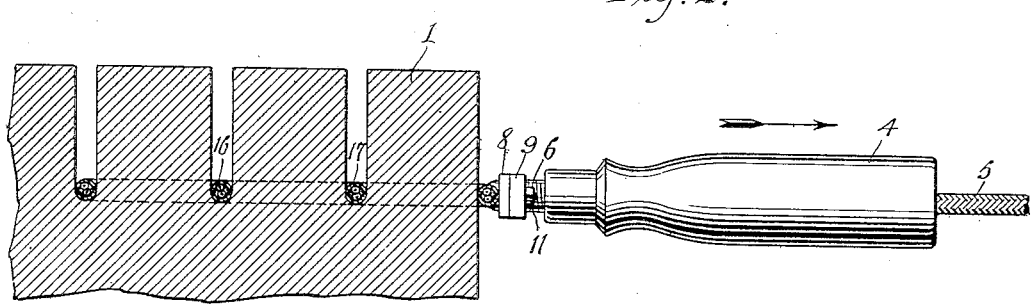
Fig. 2 is a sectional view through Fig. 1 approximately on the line 2—2.
Figure 4:
Fig. 4 is an enlarged fragmentary side view of one of the wires with the insulating members thereon, a portion of the insulating members being shown in section.

The casing 3 is preferably made of comparatively thin metal, as, for instance, thin copper, and the various parts thereof are preferably made round in cross section, as shown in Fig. 2. This casing is provided with an outside framework 12, a central longitudinal tube 13, and transverse tubes 14, 15, 16 and 17. All these tubes are also preferably round in cross section and are secured together at the point of contact so as to make a rigid casing hollow throughout, whereby the respective wires, as illustrated in diagram in Fig. 3, may be properly positioned. From the cable 5, the respective wires 18 and 19 extend and are positioned throughout the casing so that each point of the casing is provided with at least two wires carrying electrical current. The wires beyond cable 5, namely, wires 18 and 19, really form one continuous wire, and the numerals 18 and 19 merely indicate the ends of the wire as they merge into the two wires of the cable 5. The wire forming the heating element 20 is preferably formed as shown in Fig. 4, namely, with a resistance wire 21, which may be any suitable resistance wire, as, for instance, oxidized nicrome wire, though other forms of resistance wire may be used without departing from the spirit of the invention. In order to provide the desired insulation for this wire and yet allow the heat to be transmitted therefrom to the casing 3 and thence radiated outwardly, a number of rings 22 are fitted on to the wire 21, and, in fact, enough rings to loosely contact for the full length of the wire. These rings may be of any desired insulation, as, for instance, glass rings or beads. The entire structure as shown in Fig. 4, is of such a diameter that it may rather freely fit into the casing 3.

The casing 3 is preferably made in two parts, that is, an upper and a lower part, secured together by solder, welding, or other suitable means. In this way the wire is placed in one half of the casing, and the other half is placed thereon and welded or otherwise rigidly secured thereto so that the casing will be absolutely watertight. After this has been done the device is complete and ready for operation.

Figure 1:
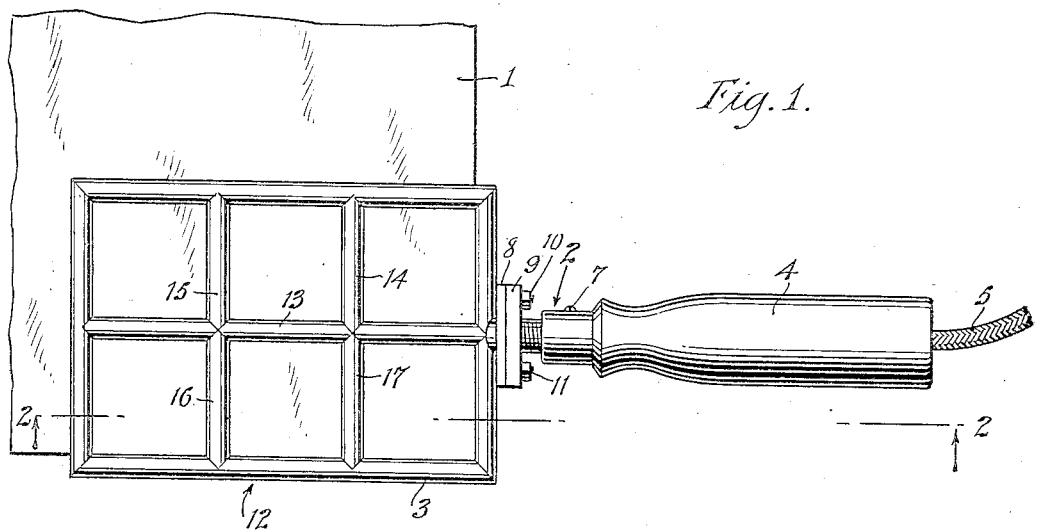
Figure 1 is a top plan view of a device disclosing an embodiment of the invention, the same being shown applied or resting on a block of ice.

The cable 5 may be connected through suitable plugs or other means, to a source of current, and when the current is turned on it will pass through the heating element 20, as shown in Fig. 3, and heat will be radiated through the casing 3. The device is then placed on a block of ice, as shown in Fig. 1, and allowed to rest thereon by its own weight though a slight pressure may be used if desired. In a very short time the heat will melt a portion of the ice so that in a certain sense the device will cut vertical grooves as illustrated in Fig. 2. After a desired depth has been cut, the person using the device pulls on the handle 4, as indicated by the arrow shown in Fig. 2, and the melting will then be in a substantially horizontal plane, whereupon the blocks within the framework will be cut off.

As shown in the accompanying drawing, six cubes of ice will be cut at one time, but, if desired, the device could be made larger or smaller, so that more or less cubes could be cut.

In using ice for cooling water or other beverages, and also for many other purposes, it is necessary to reduce a large piece of ice into small blocks or parts, and where this is done with a hammer or ice pick, various objections are present. By cutting the block of ice as shown in the accompanying drawing, very little of the ice is lost and the resulting cubes are of a very desirable shape to be used for cooling beverages and for any other purpose.

I claim:

1. A device for cutting into a block of ice in a given direction and then cutting said block of ice at right angles to said given direction, including a plurality of pipes connected together to form an enclosure, auxiliary pipes connected to the first-mentioned pipes for dividing said enclosure into the desired shaped openings, a handle connected to one of said pipes and extending substantially in the same plane as all of said pipes, said pipes being comparatively small in diameter at all points and all in substantially the same plane so that when the pipes are heated they will readily melt ice and may be guided by said handle to cut downwardly into a solid block of ice and laterally through said block, an electric resistance wire extending throughout said pipes interiorly thereof and insulated therefrom, and means for connecting said resistance wire to a source of current.

2. An ice cutter, including a casing formed of a rectangular frame formed of tubular members and a plurality of hollow transverse bars of substantially the same diameter as said members, a resistance wire extending through said casing and said hollow bars, said wire being so arranged that there will be two runs extending through each part of the casing and each part of each of said bars, an insulation surrounding said wire, and means for supplying electrical energy to said wire.

3. A device for cutting comparatively small cubes from comparatively large pieces of ice, including a casing formed of thin sheet metal tubes throughout, an exteriorly threaded tube having one end connected to one end of said casing, a bracing nut threaded on to said tube, a plurality of clamping means for securing said nut against said casing for bracing and supporting said tube, a hollow handle screwed onto said tube, a heating element arranged in said casing, and an electrical supply cable extending through said hollow cable into said casing, the wires of said cable being connected with said heating element.

JOHN E. METHVEN.